Figure 1:
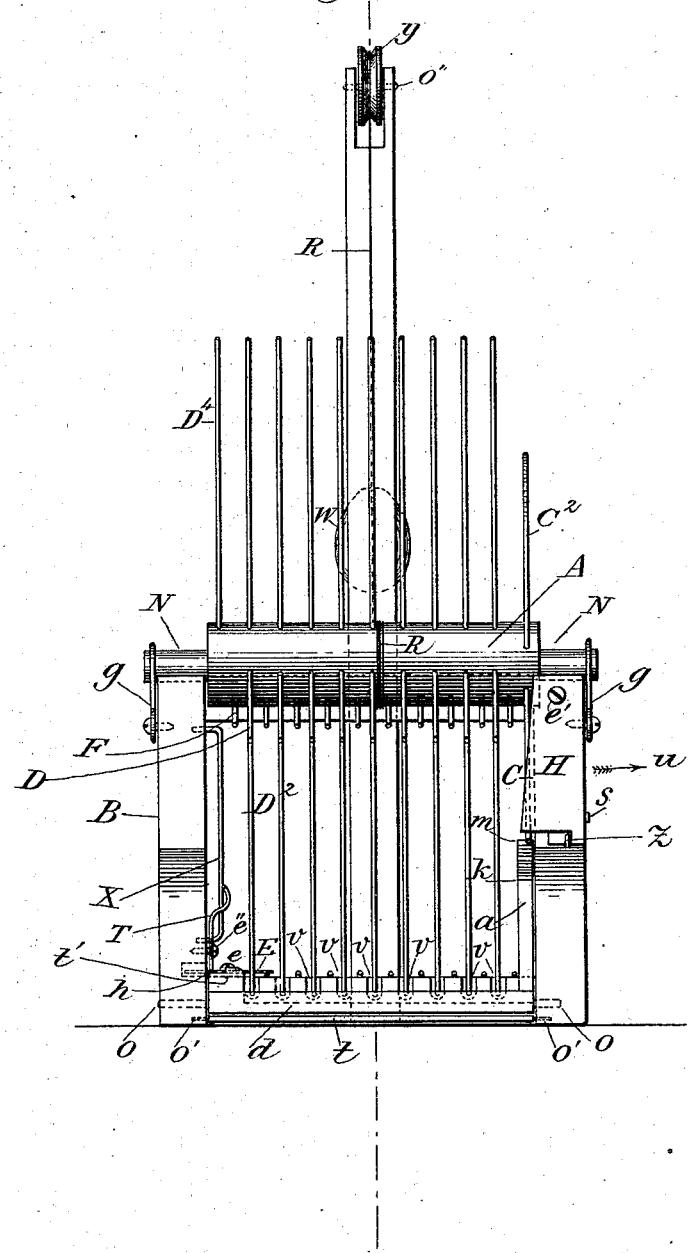

(Model.)

H. B. SWARTZ.
ANIMAL TRAP.

No. 257,904.  Patented May 16, 1882.

2 Sheets—Sheet 1.

Witnesses:
D. T. Downing
Benj. J. Jones

Inventor:
Hiram B. Swartz

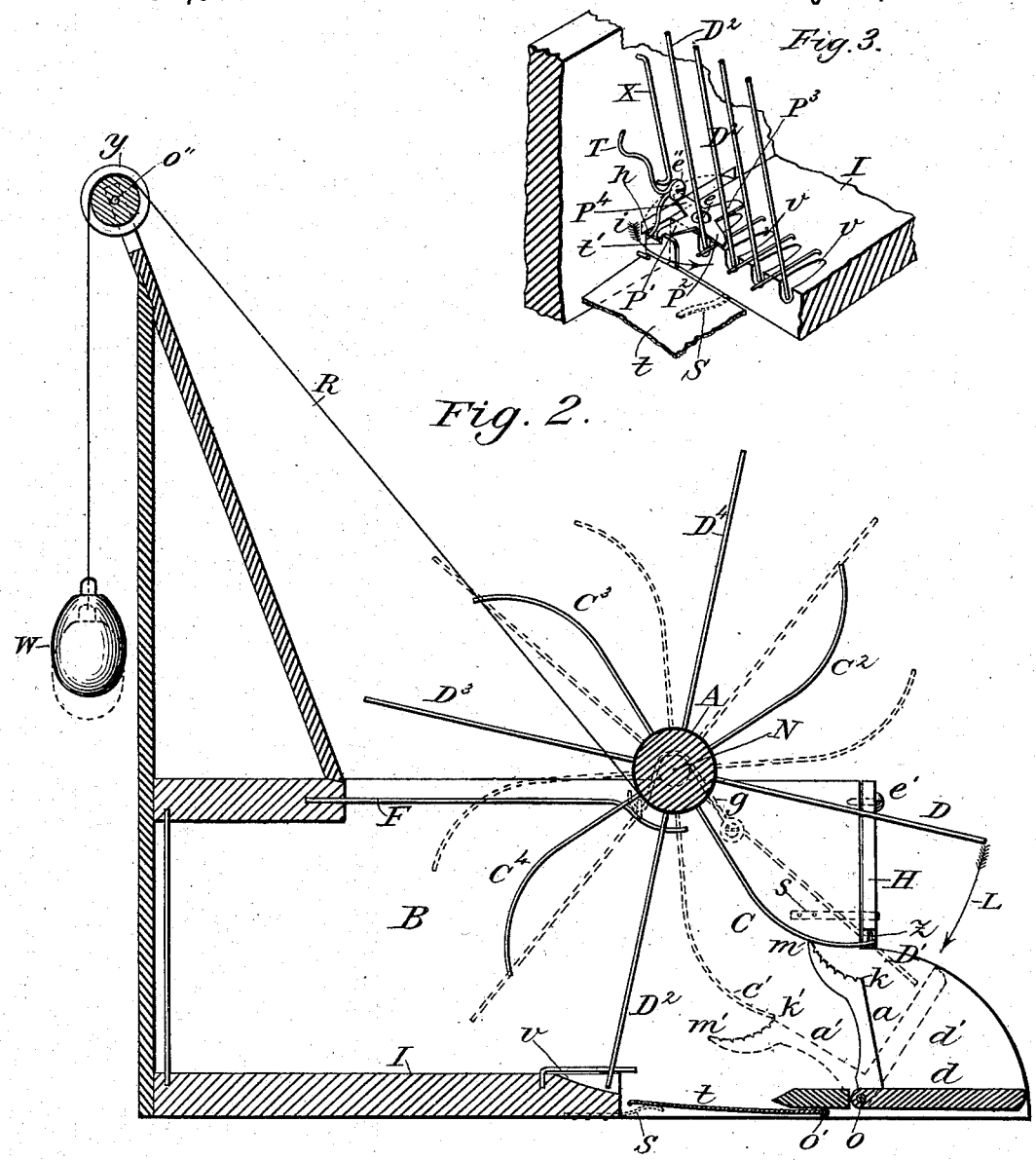

UNITED STATES PATENT OFFICE.

HIRAM B. SWARTZ, OF WOOSTER, OHIO.

ANIMAL-TRAP.

SPECIFICATION forming part of Letters Patent No. 257,904, dated May 16, 1882.

Application filed February 6, 1882. (Model.)

*To all whom it may concern:*

Be it known that I, HIRAM B. SWARTZ, of Wooster, in the county of Wayne and State of Ohio, have invented a new and Improved Animal-Trap, of which the following is a specification.

The object of my invention is to provide a self-setting animal-trap operating in such a manner as to preserve the bait, and in the same movement whereby the animal is caught to reset itself automatically, and so be always ready to catch another.

Self-setting animal-traps, having a trap wheel or reel, constructed and operated in a manner somewhat similar, have been before used.

My invention relates in part to an improvement in the construction and adjustment of the trap-wheel, whereby its movement is differently and better regulated than heretofore; and it further relates to an improvement in such traps, by the addition of certain other parts and devices connected with the trap-wheel, as hereinafter specified, whereby the mouth of the trap is more quickly and perfectly closed and locked than in traps heretofore used; and it consists, first, in constructing and adjusting the trap wheel or reel in such a manner as that, after each row of spokes passes consecutively a short distance beyond a vertical position, the outer ends of the spokes enter corresponding grooves in the floor of the trap-box, and as the trap-wheel revolves they pass between alternating fenders in the top of the box, the spokes being so arranged that the first spoke of each row comes consecutively into contact with a swivel pivoted upon the floor of the trap-box in line with the grooves, and so that the last set of spokes upon the axle constitute arms or levers arranged to come into contact consecutively with the devices for locking the trap-wheel and for elevating the tilting-board, as hereinafter described.

The trap wheel or reel as a specific device is not claimed, except as to the parts and improvements thereof above indicated in combination with the other devices of the trap.

It consists, secondly, of a device for stopping the trap-wheel at every quarter-revolution thereof by means of a swivel with four arms rotating upon a pivot at one side of the floor of the trap-box, in such a position as to engage the first spoke of each row as it comes to a vertical position across the entrance to the trap-box upon one of its arms, and at the same time the next succeeding arm comes into contact with an elevation attached to a treadle, whereby the swivel, and by it the trap-wheel, is arrested and held securely until the treadle is depressed by the weight of an animal upon it or by movement of the bait attached to a small lever, which bears upon the treadle, thereby disengaging the swivel, and at the same time the trap-wheel, to make another quarter-revolution.

It consists, thirdly, of a device for locking the trap-wheel against any backward movement by force of the animal within the trap, and also, by the same device, in connection with an arm or lever projecting from a tilting board situated in the trap-floor at the entrance, to elevate suddenly and hold up the outer side of said tilting-board while the trap-wheel is turning a quarter-revolution, and then let it drop back into its original position, when the trap-wheel is again locked by the intersection of an arm extending from the axle and a swinging stop at the end of the trap, which is a part of this device.

In the accompanying drawings, Figure 1 is a front elevation of my improved animal-trap. Fig. 2 is a vertical longitudinal section of the same, showing the operation of the parts which I claim as my invention.

In the drawings similar letters of reference indicate corresponding parts, and referring to them, A is an axle, whose gudgeons N N turn upon the upper edge of the two sides, respectively, of the trap-box B, at a distance from the extremity of the entrance end of the trap-box equal to the length of the radius of the trap-wheel.

Extending along the axle A are four rows of wire spokes, D D² D³ D⁴, projecting from the axle successively in planes at right angles to each other. The spokes are all of equal lengths, and long enough to extend from the axle A into the floor of the trap-box I, and in each row are equidistant from each other, and near enough each other to prevent the escape of the animal when caught, and are similarly situated, so that each set of four corresponding spokes will revolve in a common circle. The axle A is secured in position by means of collars $g$ $g$ in such a manner as to be readily removed from the trap-box, thereby giving entrance to the trap-box B.

About midway between the lines of each two rows of spokes, at one end of the axle A, just inside the trap-box, project four short spokes, $c$ $c^2$ $c^3$ $c^4$, which I call "spoke-arms," curved in such a shape and of such a length as to bear against the tilting arm $a$ of the tilting board $d$, and also to reach and come in contact with the lower end of the swinging stop H, which vibrates upon the pivot $e$ in the direction indicated by the arrow $u$, and is brought again into position over the spoke-arm $c$ by the spring $s$ at the side of the box, and limited in its backward movement by the stop $z$ at its lower end. The tilting arm $a$ operates directly over the pivot $o$ of the tilting board $d$, to which it is attached, and under the spoke-arm $c$, and is so constructed that its shoulder $k$ is on a line perpendicular to the pivot $o$, and distant from it one-third the radius of the trap-wheel. From the shoulder $k$ it is curved obliquely backward, so that when it reaches the position at $a'$ the arc $m'$ $k'$ will lie in the circle described by the spoke-arms $c$ as the trap-wheel revolves.

The swinging stop H, above described, is pivoted against the end of one side of the trap-box at $e'$, the upper part of the side being cut away, so as to bring the swinging stop on a line perpendicular to the pivot $o$ and the shoulder $k$, the pivot $o$ being at a distance from the extreme end of the lower part of the trap-box equal to about five-twelfths the radius of the trap-wheel, which distance is also the width of the tilting board $d$.

F is a row of wire fenders, which extend from the top of the trap-box horizontally to a point under the axle of the trap-wheel. These fenders are equidistant from each other and alternate with the spokes of the trap-wheel, so that the spokes will pass between them as the trap-wheel turns, leaving the top of the trap-box closed.

E is a swivel having four arms, P $P^2$ $P^3$ $P^4$, Fig. 1, at right angles to each other, respectively, and of equal lengths, rotating upon a pivot, $e$, upon one side of the floor of the trap-box, and situated at a distance from a line drawn vertically from the center of the axle A equal to about one-fourth the radius of the trap-wheel, and so near the line of the circle described by the first spoke, $D^2$, of each row as to engage the same, respectively, upon one of the arms at $P^2$, as near the pivot $e$ as possible. The trap-floor I is cut away near this point and its upper edge grooved at the points $v$ $v$ to correspond with and receive the ends of the spokes D, and thereby prevent them from being spread apart. Between this edge of the trap-floor and the tilting board $d$ is placed a treadle, $t$, (which I do not claim,) hinged at $o'$ $o'$ and upheld by a spring, $s$. Upon the margin of this treadle is a stop, $t'$, placed opposite the axis of the swivel E, so as to engage the extremity of its arms P, respectively, as the swivel revolves in the direction of the arrow $i$.

T is a small lever to hang the bait upon. Its fulcrum is the pivot $e''$, placed near the margin of the treadle $t$, so that its short arm may rest thereon at $h$, Fig. 2.

X is a fender, which stands in line with the downward row of spokes $D^2$ and behind the lever T, to inclose the space at the side of the trap-box behind the bait.

R is the cord, which is wound around the axle A by turning the same backward, which may be done by standing the trap upon the closed end of the trap-box and drawing aside the swinging stop H, when the parts will so adjust themselves that the axle may be readily turned backward. The cord R passes over a pulley, $y$, at the closed end of the trap-box, and to this cord the weight W is suspended which rotates the axle A.

The operation of my animal-trap is as follows: Having wound up the weight W by placing the trap upon one end and turning the trap-wheel backward, as aforesaid, and having placed the bait upon the lever T, so as not to interfere with the trap-wheel, the trap is ready for operation. The animal enters the trap over the tilting board $d$, and as soon as it bears its weight upon the treadle $t$ or interferes with the bait upon the lever T the treadle $t$ is depressed, thereby disengaging from the stop $t'$ the extremity of the arm of the swivel E. The spoke $D^2$ presses against the arm $P^2$, and as soon as the arm $P'$ is free from the stop $t'$ the trap-wheel A and the swivel E each turn a quarter-revolution, when the next succeeding arm of the swivel is arrested upon the stop $t'$, thereby holding the swivel, which in turn arrests the next succeeding spoke of the trap-wheel, leaving the trap set as before. Before each successive movement of the trap-wheel the same stands with the full force of the weight W tending to rotate it inwardly in the direction of the arrow L, Fig. 2. One row of spokes, $D^2$, extends downward almost vertically and entirely across the entrance to the trap-box B, with the first spoke of the row bearing against the arm $P^2$ of the swivel E, Fig. 1. The next succeeding row of spokes, D, Fig. 2, extends outward nearly horizontally above the mouth of the trap. The spoke-arm C rests upon the tilting arm $a$ at the point or shoulder $m$, and bears underneath the swinging stop H, which prevents any backward movement of the trap-wheel. The swivel E being set free, as aforesaid, by the depression of the treadle $t'$, the trap-wheel instantly flies around one quarter-revolution, when the horizontal row of spokes D takes the place of the vertical row $D^2$, and is there arrested and held by the arm of the swivel E, as aforesaid. In describing this quarter-revolution the spoke-arm $c$, Fig. 2, presses the tilting arm $a$ downward until both reach, respectively, the positions $a'$ $c'$, thereby elevating the tilting board $d$ to the position shown at $d''$, where it is held until the spoke-arm, as shown at $c'$, reaches the point $m''$ of the tilting arm, as shown at $a''$, when it is again released and falls to its original position as a part of the trap-floor. The peculiar shape and curvature of the arms $c$ and $a$, respectively, give greater leverage upon the tilting board $d$, as the trap-wheel A starts to revolve, and after the trap-wheel has revolved a short distance the extremity of the spoke-arm $c$ engages the tilting arm $a$ at the shoulder $k$, and brings the tilting board thereby suddenly into position with its outer edge elevated and held close to the ends of the spokes of the trap-wheel while they descend from a horizontal position, as aforesaid, thereby inclosing the mouth of the trap almost instantaneously, $D''\ d''$, Fig. 2. The horizontal row of spokes D having moved to the position of $D'$ and the tilting board $d$ having been elevated to $d''$, the mouth of the trap is completely closed thereby. At the same time the vertical row of spokes $D^2$ having moved upward to $D''$ and onward to $D^3$, the animal is forced into the trap-box. Any backward movement of the trap-wheel is prevented after the horizontal row of spokes reaches the point $D''$ by $c$ having reached the point $c''$, where it is locked against the arm $a'$ by corrugations upon its upper surface between $m'''$ and $k''$. The arm $c$ having thus performed its functions, the succeeding arm $c^2$ at the same time passes downward along the inner side of the swinging stop H, and presses the same outwardly in the direction of the dotted line $u$ until it reaches the lower end of the swinging stop, which then returns to its former position over the spoke-arm, thereby locking the same against any backward movement of the trap-wheel by the force of the animal within the trap, and this movement may be repeated until the weight W is run down, when the same may be wound up again, as aforesaid.

No claim is made upon the device to rotate the trap-wheel.

Having thus described my invention, I claim as my invention the various parts hereinafter specified, viz:

1. The combination of the trap-wheel A with the spokes D, the floor having the grooves $v$, and the fenders F, when arranged to intercorrespond, the fender X, and the set of first four spokes, $D'\ D^2\ D^3\ D^4$, when arranged to intersect consecutively the swivel E, substantially as shown and described, and for the purposes specified.

2. The combination of the four spoke-arms $c\ c^2\ c^3\ c^4$, extending from one end of the axle of the trap-wheel at right angles to each other, respectively, the tilting arm $a$, with the tilting board $d$, all being shaped substantially as shown, and as and for the purpose specified.

3. The combination of the four spoke-arms $c\ c^2\ c^3\ c^4$ with the swinging stop H upon the pivot $e$, operated and limited in its movement by the spring $s$ and the stop $z$, substantially as and for the purpose specified.

4. The swivel E, having four arms, $P\ P^2\ P^3\ P^4$, at right angles to each other, respectively, and rotating upon a pivot, $e''$, in connection with the stop $t'$, which limits its movement, and the lever T, fulcrumed at $e''$, and resting with its short arm upon the treadle $t$, substantially as and for the purpose specified.

HIRAM B. SWARTZ.

Witnesses:

DAVID THOMPSON DOWNING,
BENJAMIN J. JONES.